United States Patent [19]
Kitamura

[11] Patent Number: 6,006,595
[45] Date of Patent: Dec. 28, 1999

[54] DEVICE FOR VIBRATING CANTILEVER

[75] Inventor: Shinichi Kitamura, Saitama, Japan

[73] Assignee: Jeol Ltd., Tokyo, Japan

[21] Appl. No.: 08/911,444

[22] Filed: Aug. 12, 1997

[30] Foreign Application Priority Data

Aug. 12, 1996 [JP] Japan .................................. 8-212715

[51] Int. Cl.$^6$ .................................................. G01B 7/34
[52] U.S. Cl. ........................... 73/105; 310/357; 310/359
[58] Field of Search .............................. 73/105; 310/338, 310/348, 357, 359

[56] References Cited

U.S. PATENT DOCUMENTS

| | | | |
|---|---|---|---|
| 3,553,704 | 1/1971 | Paine ....................................... | 343/768 |
| 3,758,199 | 9/1973 | Thaxter .................................. | 359/224 |
| 4,281,298 | 7/1981 | Gounji et al. .......................... | 310/357 |
| 4,403,166 | 9/1983 | Tanaka et al. .......................... | 310/332 |
| 4,803,763 | 2/1989 | Eturo et al. .......................... | 310/359 X |
| 4,885,498 | 12/1989 | Wakita ................................. | 310/359 X |
| 5,001,681 | 3/1991 | Bertoldi et al. ..................... | 310/359 X |
| 5,107,114 | 4/1992 | Nishioka et al. ..................... | 73/105 X |
| 5,818,150 | 10/1998 | Yamamoto et al. ................... | 310/359 |

OTHER PUBLICATIONS

"Atomic force microscope–force mapping and profiling on a sub 100–Å scale", Y. Martin, C.C. Williams and H.K. Wickramasinghe, *J. Appl. Phys.*, 61 (10), May 15, 1987 (pp. 4723–4729).

*Primary Examiner*—Thomas P. Noland
*Attorney, Agent, or Firm*—Webb Ziesenheim Logsdon Orkin & Hanson, P.C.

[57] ABSTRACT

There is disclosed a device for applying vibrations to a cantilever used in an atomic force microscope. The cantilever has a base portion, and a probe is attached to the front end of the cantilever. The device has a piezoelectric plate subassembly consisting of first and second piezoelectric plates having junction faces cemented together. A piezoelectric plate subassembly support portion supports a part of the second piezoelectric plate. A voltage is applied to the piezoelectric plates so that one of them is stretched vertical to the junction faces and that the other is contracted vertical to the junction faces.

7 Claims, 5 Drawing Sheets

DEVICE FOR VIBRATING CANTILEVER

FIELD OF THE INVENTION

The present invention relates to a device for vibrating a cantilever used in a scanning probe microscope such as a noncontact atomic force microscope (i.e., attractive-mode atomic force microscope) and, more particularly, to a cantilever-vibrating device using piezoelectric plates. This kind of cantilever-vibrating device is used to vibrate a cantilever at its resonance frequency, the cantilever holding a probe at its front end.

BACKGROUND OF THE INVENTION

Where the topography of a sample surface is investigated by a scanning probe microscope such as a noncontact atomic force microscope (NC-AFM), it is necessary to maintain constant the space between the sample surface and the probe tip. Therefore, this space must be constantly detected. One method of accomplishing this is to utilize changes in the attractive atomic force (i.e., force gradient) exerted between the sample surface and the probe tip. That is, the attractive force increases as the space decreases.

FIG. 6 illustrates a noncontact atomic force microscope (AFM) This microscope has a scanner support portion 01 that supports an XY scanner 02 moving within the XY plane and a Z scanner 03 moving quite small distances along the Z-axis, or up and down. A sample 04 is placed on the top end surface of the Z scanner 03. An XY-scanning signal generator 06 and a Z scanner drive circuit 07 supply a scanning signal and a driving signal, respectively, to the XY scanner 02 and the Z scanner 03, respectively.

A cantilever 08 made of a resilient material is positioned above the sample 04. One end of the cantilever 08 is fixed to piezoelectric plates 09 that apply vibrations to the cantilever. A probe 012 is mounted to the front end of the cantilever 08 such that the tip of the probe 012 faces the sample 04. The piezoelectric plates 09 are made of bimorph and act to vibrate the cantilever 08.

Heretofore, some methods have been available to detect the force gradient in the noncontact atomic force microscope described above.

(a) Slope Detection Method

FIG. 7 illustrates the slope detection method. The cantilever 08 is forcedly vibrated at a frequency of $\omega_d$. The space S (FIG. 6) between the probe 012 on the cantilever 08 and the sample 04 varies. The resonance frequency of the cantilever 08 changes from $\omega_0$ to $\omega_0'$. At this time, the amplitude of the cantilever varies. The result is shown in the graph of FIG. 7. Where the space S is reduced while the atomic force is exerted between the probe 012 and the sample 04, the resonance frequency of the cantilever 08 drops.

As can be seen from the graph of FIG. 7, where the resonance frequency $\omega_0$ of the cantilever 08 is moved away from the fixed frequency $\omega_d$ and reaches $\omega_0'$, the amplitude of the cantilever 08 forcedly vibrated at $\omega_d$ decreases from $A_0$ to $A_0'$. Accordingly, the changes in the space S can be detected by detecting the increases in the amplitude $\Delta A$. In this way, the slope detection method is to detect changes in the space S between the probe 012 and the sample 04 by detecting the decreases in the amplitude $\Delta A$.

(b) FM Detection Method

In FIG. 6, if the space S between the probe 012 of the cantilever 08 and the sample 04 varies, the resonance frequency of the cantilever 08 changes. That is, where the space S decreases within the range in which an atomic force is exerted between the probe 012 and the sample 04, the resonance frequency of the cantilever 08 drops. Therefore, changes in the space S can be detected by vibrating the cantilever 08 at its resonance frequency at all times and detecting variations in the vibration frequency of the cantilever 08. In this method, the Q value of the mechanical vibration of the cantilever 08 becomes very large in a vacuum. Therefore, it is considered that the FM detection method is more appropriate than the slope detection method that is generally used under atmospheric pressure.

In the above-described FM detection method, the cantilever 08 is vibrated always at its resonance frequency, and changes in the vibrational frequency of the cantilever are detected. Thus, changes in the space S are detected. Therefore, the degree of stability of the oscillating system containing the cantilever 08 greatly affects the performance of the instrument. That is, the ability to supply a stable oscillating signal to the cantilever-vibrating device dominates the performance of the instrument. The following techniques related to this kind of cantilever-vibrating device are known.

FIG. 8 illustrates a noncontact atomic force microscope (AFM) equipped with a cantilever-vibration device making use of the prior art FM detection method. It is to be noted that like components, or 01–012, are indicated by like reference numerals in both FIGS. 6 and 8. A laser 013 directs laser light L onto the cantilever 08. The laser light reflected by the cantilever 08 reaches a photodetector 014, which detects the incident light. This photodetector 014 consists of two discrete photodiodes. The laser light L reflected from the top surface of the cantilever 08 oscillates across the boundary between the two photodiodes. The difference between the output signals from the two discrete photodiodes is a sine wave corresponding to the vibrations of the cantilever 08. The oscillation frequency of the cantilever 08 is detected from this sine wave.

The obtained oscillation signal is fed to an amplifier 017 whose gain is adjusted by an AGC (automatic gain control) circuit 016. This AGC circuit 016 controls the gain of the amplifier 017 in such a way that the amplitude of the output signal from the photodetector 014 is kept constant. The output signal from the amplifier 017 is supplied to a band-pass filter 018, which extracts only frequencies close to the resonance frequency of the cantilever 08. The phase of the output signal from the band-pass filter 018 is adjusted by a phase-adjusting circuit 019. The output signal from the phase-adjusting circuit 019 is supplied as a driving signal to the vibration-applying piezoelectric plates 09. As a result, a self-oscillating positive feedback loop is formed. Consequently, the cantilever 08 is vibrated at its resonance frequency.

The output signal from the photodetector 014 is converted into a voltage signal by a frequency-to-voltage converter circuit 021. The voltage signal Vfv from the converter circuit 021 is sent to a reference voltage comparator 022. This comparator 022 produces the difference between the voltage signal Vfv and a reference voltage signal VfvO and sends a signal to the Z scanner drive circuit 07 via a low-pass filter 023 so that the difference (Vfv–VfvO) becomes zero. The reference voltage signal VfvO is a voltage corresponding to the preset-space between the probe 012 and the sample 04.

The differential signal extracted via the low-pass filter 023 and a scanning signal from the XY scanning signal generator 06 are supplied to an image-creating circuit 024, which in turn creates a topographic image of the surface of the sample 04.

The sample 04 is moved toward the probe 012 while the cantilever 08 is oscillating with a given amplitude, until an atomic force is exerted between the sample 04 and the probe 012. Then, the space is maintained constant. The surface of the sample 04 is scanned within the XY plane in two dimensions by the XY scanner 02. As the distance between the sample 04 and the probe 012 decreases, the resonance frequency of the cantilever 08 decreases by the effect of the atomic force acting on the probe 012. The cantilever 08 vibrates at reduced frequencies. As the distance between the sample 04 and the probe 012 increases, the cantilever vibrates with increasing frequency. At distances where the atomic force can be neglected, the vibration frequency is coincident with the resonance frequency of the cantilever 08 that is intrinsic to the cantilever.

For example, if the surface of the sample 04 has a convex portion, and if the cantilever 08 vibrates at decreasing frequency as the distance between the probe 012 and the sample 04 decreases as a result of the two-dimensional scan made by the XY scanner 02, the voltage signal Vfv drops, thus increasing the differential signal. The Z scanner 03 immediately lowers the sample 04 so that the distance to the probe 012 increases, thus providing feedback control. Therefore, the distance between the probe 012 and the sample 04 is held at a given value determined by the reference voltage VfvO. Since this control is constantly provided, the feedback signal (differential signal) supplied to the Z scanner drive circuit 07 corresponds to the topography of the sample surface. This feedback signal is accepted as an image signal into the image-creating circuit 024 in relation to the two-dimensional scan made by the XY scanner 02. An image is displayed according to the accepted image signal. In this way, a topographic image of the surface of the sample 04 owing to the atomic force can be displayed.

The prior art technique has the following problems. Generally, the bimorph forming the vibration-applying piezoelectric plates 09 has a high degree of sensitivity. That is, these piezoelectric plates are displaced by large amounts when a unit voltage is applied. It is assumed that the cantilever 08 has a spring constant of approximately 40 N/m and a resonance frequency of about 300 kHz. If this cantilever 08 is vibrated at its resonance frequency in an ultrahigh vacuum, the amplitude of vibrations at the tip of the cantilever 08 is tens of thousands times as large as the amplitude of the applied vibrations. Accordingly, if vibrations are applied, using piezoelectric plates having a relatively small sensitivity of about 1 nm/V, and if the amplitude of the vibrations at the tip should be set to the order of nanometers, then the voltage applied to the piezoelectric plates is approximately 0.1 mV. This feeble voltage must be controlled within the oscillator circuit. As a result, the oscillation becomes unstable, and variations in the resonance frequency of the body of the cantilever due to the atomic force are detected with decreased sensitivity.

SUMMARY OF THE INVENTION

In view of the foregoing, the present invention has been made. It is an object of the present invention to provide a cantilever-vibrating device capable of vibrating piezoelectric plates at appropriate amplitudes stably by applying a voltage of an alternating magnitude that is easy to control.

This object is achieved in accordance with the teachings of the invention by a device for applying vibrations to a cantilever having a base portion and probe at its front end, the device comprising: a piezoelectric plate subassembly consisting of a first and a second piezoelectric plates having their junction faces cemented together; a piezoelectric plate subassembly support member for supporting a part of the piezoelectric plate subassembly; and a voltage application means. The base portion of the cantilever is held by the second piezoelectric plate. The voltage application means applies a voltage to the piezoelectric plate subassembly such that alternating one of the first and second piezoelectric plates is stretched vertical, i.e. perpendicular, to the junction faces and that the other is contracted vertical, i.e. perpendicular, to the junction faces.

Other objects and features of the invention will appear in the course of the description thereof, which follows.

DETAILED DESCRIPTION OF THE INVENTION

Figure 1:
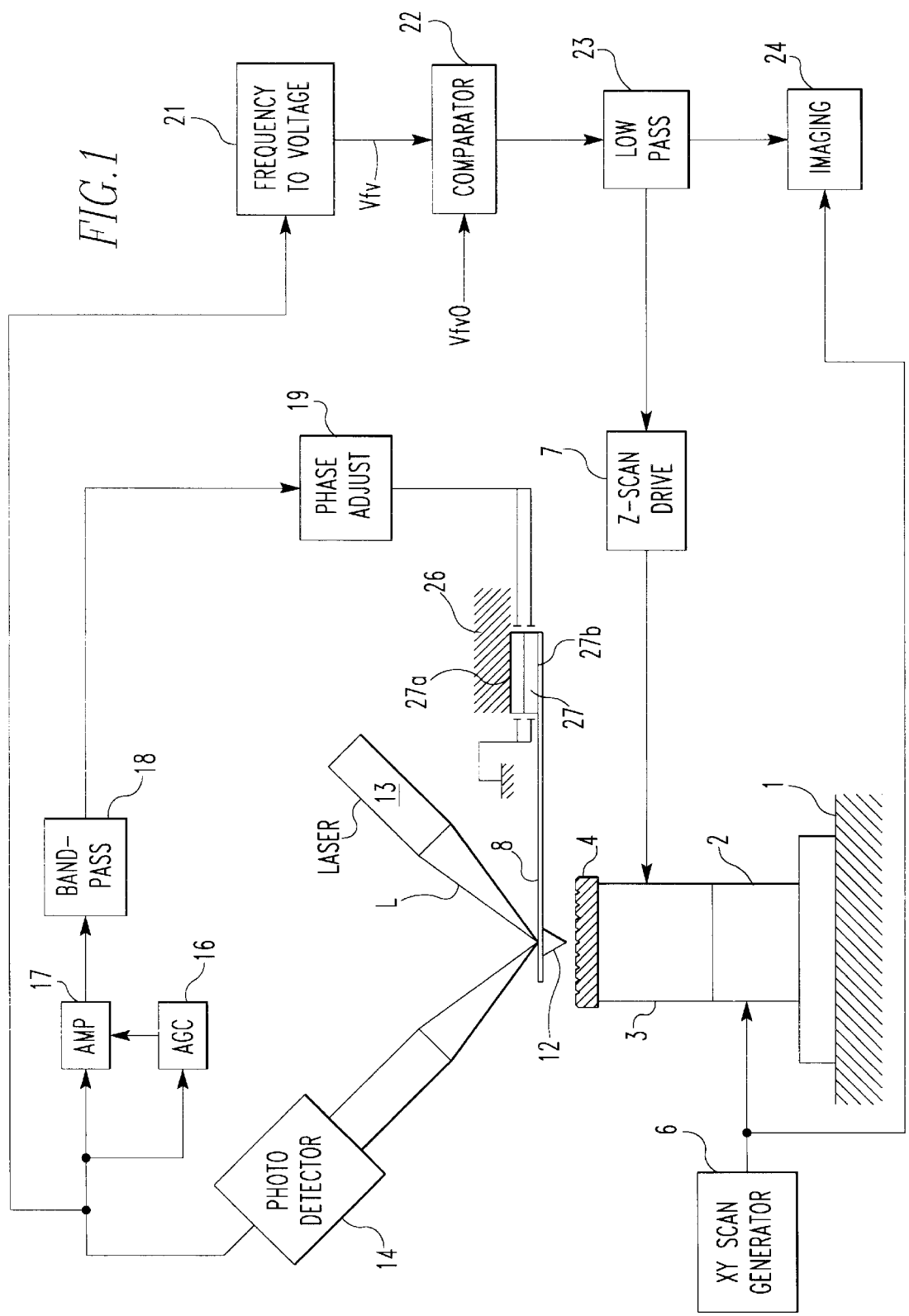
FIG. 1 is a block diagram of a noncontact atomic force microscope comprising a cantilever-vibrating device according to Embodiment 1 of the invention.
Figure 2A:
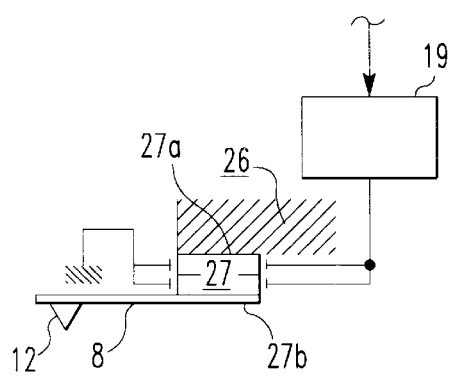
FIG. 2(*a*) is a block diagram and FIG. 2(*b*) is a perspective view of a vibrating piezoelectric plate subassembly included in the cantilever-vibrating device shown in FIG. 1.
Figure 2B:
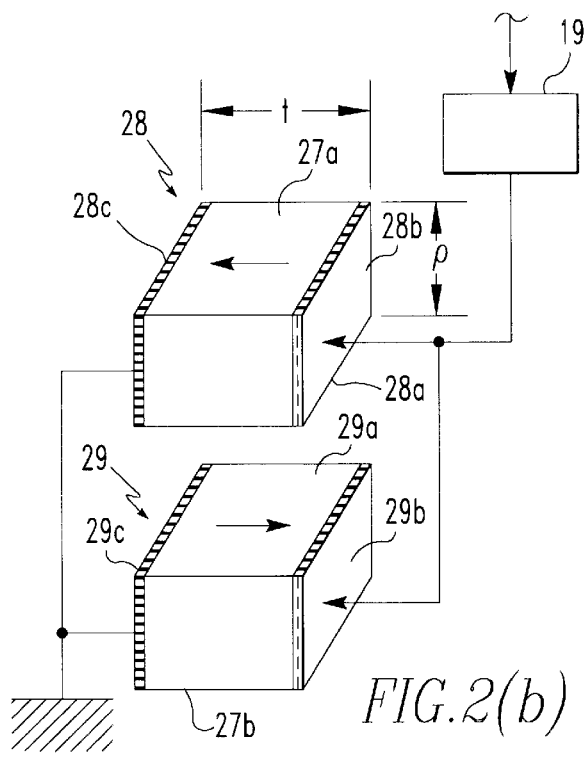
Figure 8:
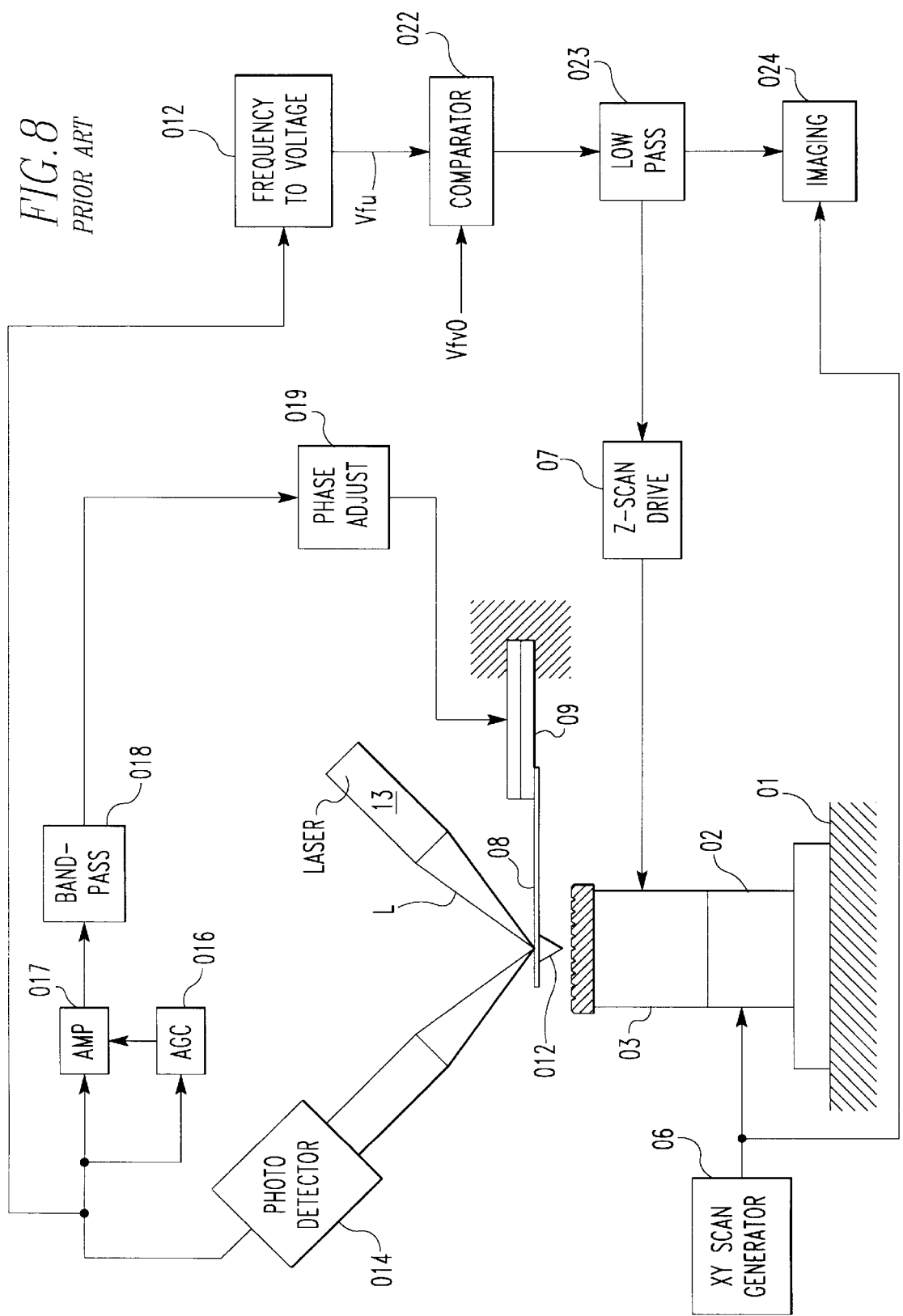
FIG. 8 is a block diagram of a noncontact atomic force microscope equipped with a cantilever-vibrating device utilizing the prior art FM detection method.

Referring to FIG. 1, there is shown a noncontact atomic force microscope comprising a cantilever-vibrating device forming Embodiment 1 of the invention. FIG. 2 shows a piezoelectric plate subassembly included in the cantilever-vibrating piezoelectric plate subassembly included in the cantilever-vibrating device shown in FIG. 1. It is to be noted that like components are indicated by like components in FIGS. 1 and 8; however, "0" is omitted in FIG. 1 from every reference numeral.

Referring to FIGS. 1 and 2, a piezoelectric plate subassembly support member 26 is mounted integrally with the body of the noncontact atomic force microscope and supports a piezoelectric plate subassembly 27 for applying vibrations. The piezoelectric plate subassembly 27 consists of two piezoelectric plates having different degrees of sensitivity. The subassembly 27 has a supported portion 27*a* in contact with the subassembly support member 26. The subassembly 27 further has a cantilever-supporting portion 27*b* on the opposite side of the supported portion 27*a*. The cantilever 8 is held to the cantilever-supporting portion 27*b*.

The vibration-applying piezoelectric plate subassembly 27 consists of first piezoelectric plate 28 and second piezoelectric plate 29 that have junction faces 28*a* and 29*a*, respectively, extending parallel to the directions of polarization. These junction faces 28*a* and 29*a* are cemented together. These piezoelectric plates are polarized in opposite directions. Electrode surfaces 28b and 28c are formed vertical to the junction face 28a. Electrode surfaces 29b and 29c are formed vertical to the junction face 29a. The electrode surfaces 28b and 29b are connected with the phase-adjusting circuit 21, while the electrode surfaces 28c and 29c are grounded. The junction faces 28a and 29a are adhesively or otherwise cemented together.

In FIG. 2, the two piezoelectric plates 28 and 29 with different degrees of sensitivity are arranged so as to cancel out their displacements, i.e., the directions of polarization are opposite to each other. If the piezoelectric plates 28 and 29 of different degrees of sensitivity are made of lead titanate-based piezoelectric materials M1 and M5 produced by Fuji Ceramic Co., Ltd., Japan, so that displacements of these plates 28 and 29 cancel out, their degrees of sensitivity are 4.3 nm/V and 4.7 nm/V, respectively, in $d_{31}$ mode. Suppose that each of the piezoelectric plates 28 and 29 has a thickness of t and a length of ρ. If a voltage V is applied, the amount of displacement, or sensitivity, of each of the piezoelectric plates 28 and 29 is given by $$\Delta\rho = d_{31} \cdot \rho \cdot V/t \qquad (1)$$

where $d_{31}$ is the equivalent piezoelectric constant of the $d_{31}$ mode. Assuming that t=ρ, the amount of displacement ΔL of the piezoelectric plate subassembly is given by $$|\Delta L| = (4.7-4.3)\ nm/V = 0.4\ nm/V \qquad (2)$$

Accordingly, where the amplitude of the piezoelectric plate subassembly is set to a few nanometers (e.g., 1 nm), the absolute value of the applied voltage is given by $$1\ (nm)/0.4\ (nm/V) = 2.5\ (V) \qquad (3)$$

If the shape is so determined that the ratio of the length to the thickness, or t/ρ, is equal to 10, then it is necessary to apply a voltage of 25 V. It is to be noted that the aforementioned amplifier 17, AGC circuit 16, band-pass filter 18, and the phase-adjusting circuit 19 together constitute a voltage application means.

The operation of Embodiment 1 constructed as described above is next described. In FIG. 2, the vibrating piezoelectric plate subassembly 27 supporting the cantilever 8 is vibrating at the resonance frequency of the cantilever 8. The piezoelectric plates 28 and 29 of the subassembly 27 are cemented together such that their directions of polarization are opposite to each other. Under this condition, the phase-adjusting circuit 19 applies a driving voltage to the piezoelectric plates 28 and 29 such that the direction of the applied voltage is in the direction of polarization of one of the plates 28 and 29 and that the direction of the voltage is opposite to the direction of polarization of the other. At this time, if the piezoelectric plate 28 contracts, it is stretched vertical to the direction of polarization by an amount corresponding to the volume of this piezoelectric plate. If the piezoelectric plate 29 to which the voltage is applied in a direction opposite to the direction of polarization is stretched, the plate 29 contracts vertical to the direction of polarization by an amount corresponding to the volume of this plate. In consequence, their displacements cancel out. Therefore, if these two piezoelectric plates differ in amount of displacement, the vibration-applying piezoelectric plate subassembly 27 is displaced only an amount equal to the difference between their displacements. Therefore, if the driving voltage that is easy to control is applied to the piezoelectric plate subassembly 27, the amplitude of the vibration is not augmented exorbitantly. Rather, the body of the cantilever 8 vibrates stably.

Figure 3A:
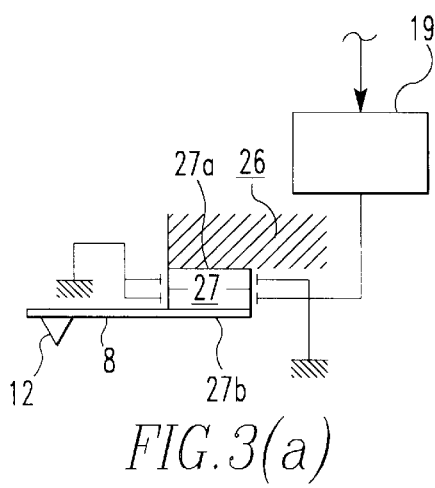
FIGS. 3(*a*) and 3(*b*) are views similar to FIGS. 2(*a*) and 2(*b*) but showing Embodiment 2 of the invention.
Figure 3B:
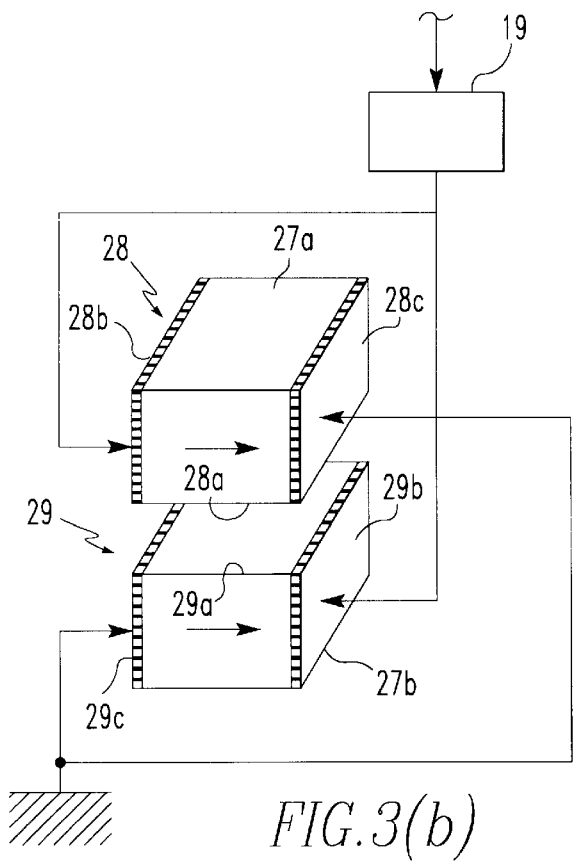

FIG. 3 is a view similar to FIG. 2, but showing Embodiment 2 of the invention. Embodiment 2 is similar to Embodiment 1 except for the following points. The piezoelectric plates 28 and 29 are cemented together so that they are polarized in the same direction. A voltage is applied to the piezoelectric plates 28 and 29 so that the direction of the voltage applied to one of the plates 28 and 29 is the same as the direction of polarization and that the direction of the voltage applied to the other is opposite to the direction of polarization. Embodiment 2 yields the same advantages as Embodiment 1 described above.

Figure 4A:
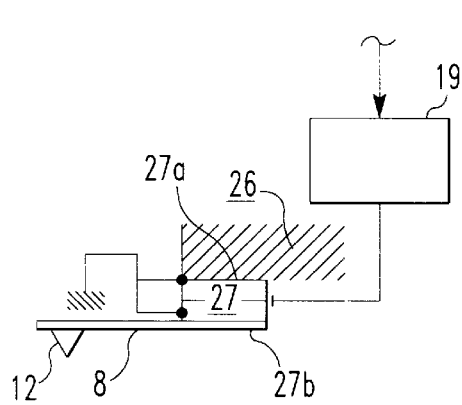
FIGS. 4(*a*) and 4(*b*) are views similar to FIGS. 2(*a*) and 2(*b*) but showing Embodiment 3 of the invention.
Figure 4B:
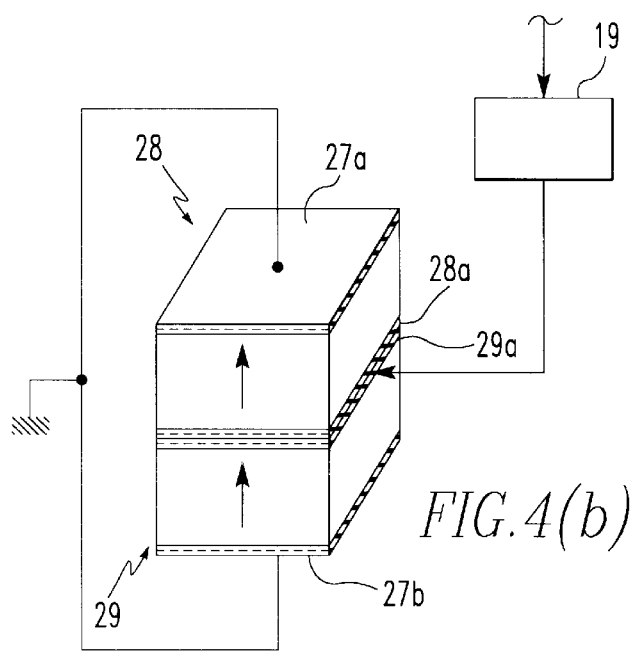

FIG. 4 is a view similar to FIG. 2, but showing Embodiment 3 of the invention. Embodiment 3 is similar to Embodiment 1 except for the following points. The piezoelectric plates 28 and 29 have junction faces 28a and 29a that are vertical to a common direction of polarization and cemented together. The junction faces 28a and 29a have electrodes electrically connected with the aforementioned phase-adjusting circuit 19. The supported portion 27a and the cantilever-supporting portion 27b have electrodes grounded. The phase-adjusting circuit 19 applies a driving voltage to the vibration-applying piezoelectric plate subassembly 27 such that the direction of the voltage applied to one of the plates 28 and 29 is the same as the direction of polarization and that direction of the voltage applied to the other is opposite to the direction of polarization. If one of the piezoelectric plates 28 and 29 is contracted and the other is stretched, their displacements cancel out. Therefore, if the piezoelectric plates differ in amount of displacement, the piezoelectric plate subassembly 27 is displaced by an amount equal to the difference between their displacements. Therefore, if the driving voltage having a magnitude that can be easily controlled is impressed on the piezoelectric plate subassembly 27, the amplitude of the vibration is not augmented extremely. Rather, the cantilever 8 vibrates stably.

Figure 5A:
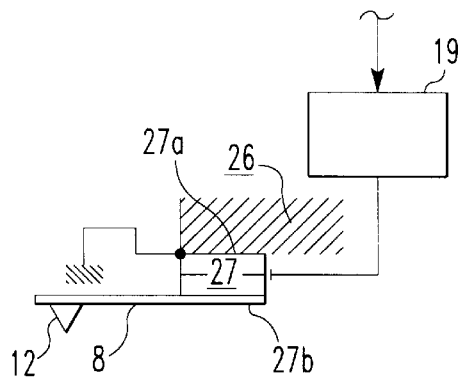
FIGS. 5(*a*) and 5(*b*) are views similar to FIGS. 2(*a*) and 2(*b*) but showing Embodiment 4 of the invention.
Figure 5B:
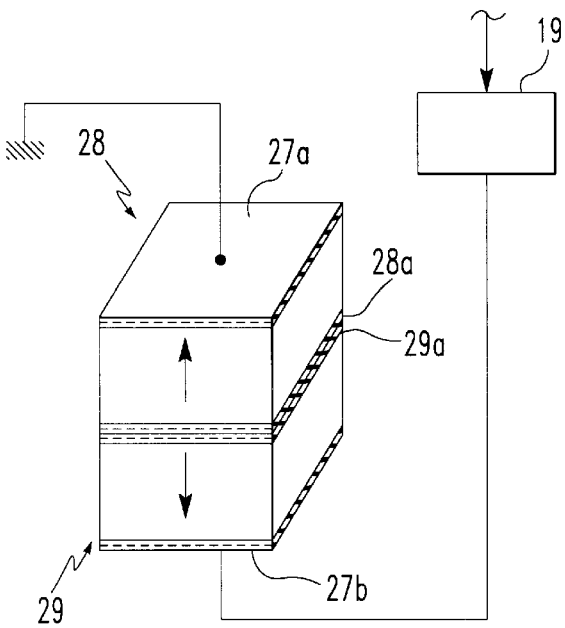
Figure 6:
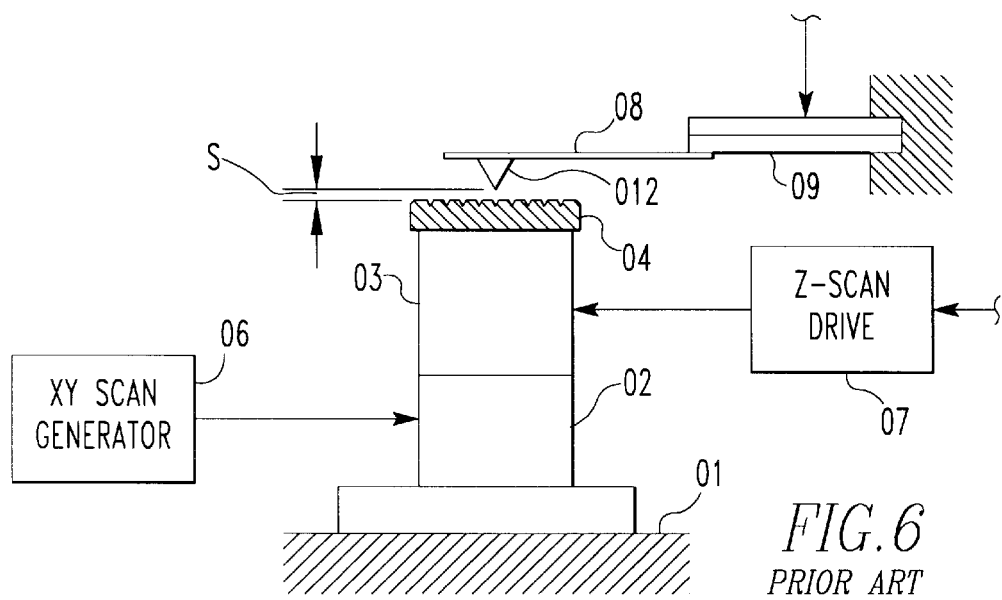
FIG. 6 is a front elevation of a noncontact atomic force microscope.
Figure 7:
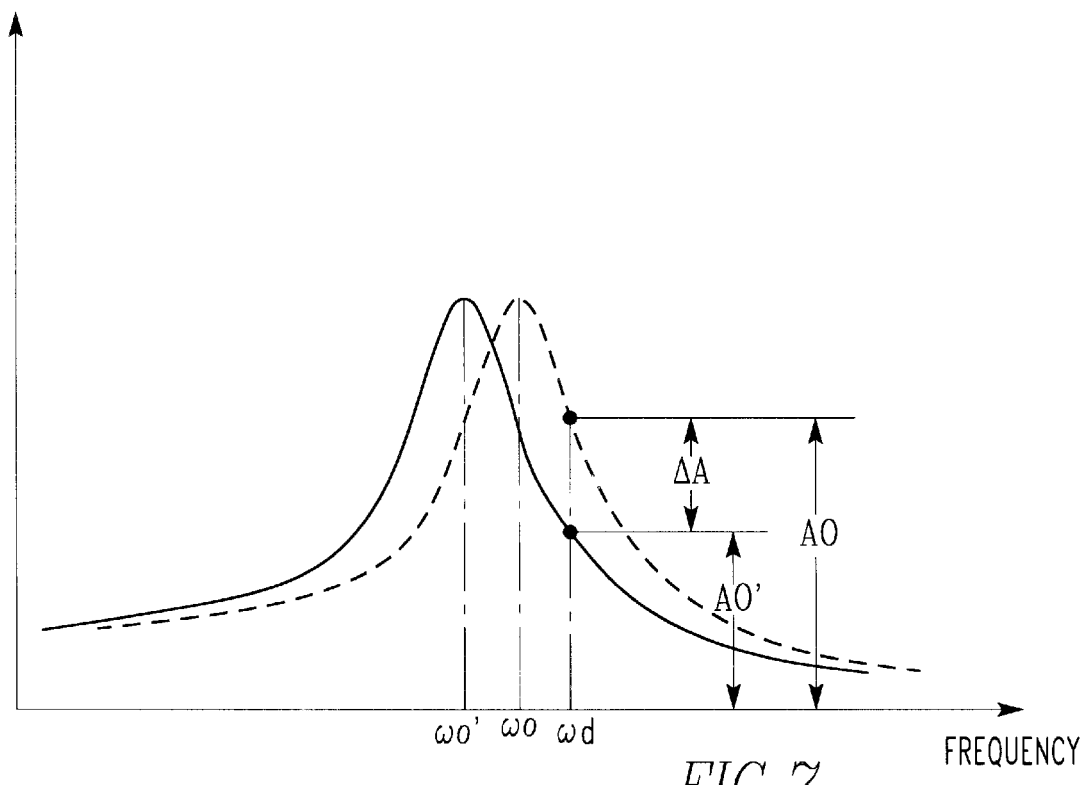
FIG. 7 is a graph illustrating the slope detection method, showing variations in the amplitude of a cantilever caused by variations in the resonance frequency of the cantilever when the space between the probe on the cantilever and a sample is varied.

FIG. 5 is a view similar to FIG. 2, but showing Embodiment 4 of the invention. Embodiment 4 is similar to Embodiment 3 except for the following points. The piezoelectric plates 28 and 29 are cemented together such that their directions of polarization are opposite to each other. Electrodes are formed on the junction faces 28a and 29a of the piezoelectric plates 28 and 29. Grounded electrodes are formed on the supported face 27a. Electrodes electrically connected with the phase-adjusting circuit 19 are formed on the cantilever-supporting face 27b. A driving voltage is applied between the electrodes formed on the supported face 27a and on the cantilever-supporting face 27b. At this time, one of the piezoelectric plates 28 and 29 is stretched, while the other is contracted. Embodiment 4 produces the same advantages as Embodiment 3.

While the preferred embodiments of the invention have been described in detail, it is to be understood that the invention is not limited to those embodiments but rather various changes and modifications are possible within the scope of the present invention delineated by the claims. For instance, the invention can be applied to a cantilever-vibrating device for use with a scanning probe microscope other than a noncontact atomic force microscope.

What is claimed is:

1. A device for applying vibrations to a cantilever having an attached base portion, said cantilever having a probe at its unattached end, said device comprising:

a piezoelectric plate subassembly consisting of a first piezoelectric plate and a second piezoelectric plate having their respective junction faces cemented together;

a piezoelectric plate subassembly support member for supporting a part of said first piezoelectric plate;

said second piezoelectric plate having a cantilever support portion for supporting said base portion of said cantilever; and an alternating voltage application means for applying a voltage to said first and second piezoelectric plates so that alternately one of said plates is stretched perpendicular to said junction faces and that the other is contracted perpendicular to said junction faces.

2. The device of claim 1, wherein said first and second piezoelectric plates have different degrees of sensitivity.

3. The device of claim 1, wherein said piezoelectric plate subassembly is so constructed that said first and second piezoelectric plates are polarized in opposite directions and parallel to said junction faces.

4. The device of claim 1, wherein said piezoelectric plate subassembly is so constructed that said first and second piezoelectric plates are polarized in the same direction and parallel to said junction faces.

5. The device of claim 1, wherein said piezoelectric plate subassembly is so constructed that said first and second piezoelectric plates are polarized in the same direction and perpendicular to said junction faces.

6. The device of claim 1, wherein said piezoelectric plate subassembly is so constructed that said first and second piezoelectric plates are polarized in opposite directions and perpendicular to said junction faces.

7. The device of claim 1, wherein the first and second piezoelectric plates stretch and contract in the vertical direction.

* * * * *

UNITED STATES PATENT AND TRADEMARK OFFICE
CERTIFICATE OF CORRECTION

PATENT NO. : 6,006,595
DATED : December 28, 1999
INVENTOR(S) : Shinichi Kitamura It is certified that error appears in the above-identified patent and that said Letters Patent is hereby corrected as shown below:

Column 1 Line 25 after "(AFM)" insert period --.--.

Column 4 Line 7 "alternating" should read --alternately--.

Column 6 Line 66, Claim 1, delete "their".

Signed and Sealed this

Seventeenth Day of October, 2000

Attest:

Q. TODD DICKINSON

*Attesting Officer*  *Director of Patents and Trademarks*